United States Patent
Zhang et al.

(10) Patent No.: US 11,684,965 B2
(45) Date of Patent: Jun. 27, 2023

(54) METHOD FOR FORMING LARGE-SIZE QCR0.8 ALLOY TAPERED CYLINDRICAL RING

(71) Applicant: Xi'an Space Engine Company Limited, Shaanxi (CN)

(72) Inventors: Jing Zhang, Shaanxi (CN); Jinwu Miao, Shaanxi (CN); Yanpei Shi, Shaanxi (CN); Kai Wang, Shaanxi (CN); Zhimin Chen, Shaanxi (CN); Yang Ding, Shaanxi (CN); Guojin Zhang, Shaanxi (CN)

(73) Assignee: Xi'an Space Engine Company Limited, Xi'an (CN)

( * ) Notice: Subject to any disclaimer, the term of this patent is extended or adjusted under 35 U.S.C. 154(b) by 0 days.

(21) Appl. No.: 17/528,343

(22) Filed: Nov. 17, 2021

(65) Prior Publication Data

US 2022/0097123 A1    Mar. 31, 2022

(30) Foreign Application Priority Data

Nov. 20, 2020   (CN) .......................... 202011311170.3

(51) Int. Cl.
  *B21D 53/16*  (2006.01)
  *B21J 5/02*  (2006.01)
  *C22C 9/02*  (2006.01)

(52) U.S. Cl.
  CPC .............. *B21D 53/16* (2013.01); *B21J 5/02* (2013.01); *C22C 9/02* (2013.01)

(58) Field of Classification Search
  CPC ..... B21C 23/001; B21C 23/20; B21C 23/186; B21H 1/06; B21H 1/10; B21J 1/06; B21J 5/02; B21D 53/16; B21K 21/02
  See application file for complete search history.

(56) References Cited

U.S. PATENT DOCUMENTS

| | | | | |
|---|---|---|---|---|
| 3,681,962 A * | 8/1972 | Marcovitch | .............. | B21H 1/06 72/111 |
| 4,869,088 A * | 9/1989 | Kadotani | ................. | B21H 1/12 72/110 |
| 8,800,336 B2 * | 8/2014 | Kang | ....................... | B21H 1/06 72/107 |

FOREIGN PATENT DOCUMENTS

| CN | 101279348 A | 10/2008 |
|---|---|---|
| CN | 104259762 A | 1/2015 |

(Continued)

OTHER PUBLICATIONS

CN 108890218A, Wang et al. Nov. 2018.*

(Continued)

*Primary Examiner* — Edward T Tolan

(57) ABSTRACT

A method for forming a QCr0.8 alloy tapered cylindrical ring, including: heating a standard QCr0.8 alloy cylindrical part followed by upsetting and stretching at least twice to obtain a primary blank; heating the primary blank followed by upsetting and chamfering to obtain a secondary blank, where a diameter of a top end is greater than that of a bottom end; subjecting the secondary blank to backward extrusion to form a preform; machining the preform to remove a flash and a bottom residue; subjecting a bottom end of the preform to local bulging to enable a shape and a size thereof to match that of a drive roller in a forming tooling, so as to form a profiled ring blank; and rolling the profiled ring blank by a radial-axial ring rolling machine with the forming tooling to form the tapered cylindrical ring.

9 Claims, 2 Drawing Sheets

(56) References Cited

FOREIGN PATENT DOCUMENTS

| CN | 105127345 | A  |   | 12/2015 |              |
|----|-----------|----|---|---------|--------------|
| CN | 110640060 | A  |   | 1/2020  |              |
| DE | 729899    | C  | * | 1/1943  | B21C 23/186  |
| KR | 100769253 | B1 | * | 10/2007 | B21D 53/16   |
| KR | 101502825 | B1 | * | 3/2015  | B21C 23/186  |

OTHER PUBLICATIONS

CN 109079066A, Guo et al. Dec. 2018.*
Bing-gang Zhang et al., "Electron beam welding of 304 stainless steel to QCr0.8 copper alloy with copper filler wire", Transactions of Nonferrous MetalsSociety of China, 2014, pp. 4059-4066.
Y.C. Wang et al., "Scanning strategy dependent tensile properties of selective laser melted GH4169", Materials Science & Engineering A, 2020, Entire document.

* cited by examiner

METHOD FOR FORMING LARGE-SIZE QCR0.8 ALLOY TAPERED CYLINDRICAL RING

CROSS-REFERENCE TO RELATED APPLICATIONS

This application claims the benefit of priority from Chinese Patent Application No. 202011311170.3, filed on Nov. 20, 2020. The content of the aforementioned application, including any intervening amendments thereto, is incorporated herein by reference in its entirety.

TECHNICAL FIELD

This application relates to forging forming, and more particularity to a method for forming a QCr0.8 alloy tapered cylindrical ring.

BACKGROUND

Thrust chamber is a vital part of the new-generation liquid propellant rocket engine, and can work under high temperature, high pressure and strong vibration. The thrust chamber has a double-layer structure, of which an inner wall of the thrust chamber is formed by forging of QCr0.8 alloy with excellent thermal conductivity. The continuous enhancement of thrust loading of the engine contributes to an expansion of the inner wall of the thrust chamber. For an inner wall of a tapered cylindrical part with a bottom diameter greater than 500 mm and a top diameter greater than 1000 mm, its forming process generally requires a difficultly-available and expansive squeezing press machine with 800,000 KN and a large tooling when using a traditional forging method. The formation of a single product will consume more than 1.4 tons of raw materials, and the utilization rate is less than 5%. Moreover, the raw material has a size greater than Φ450×1000 mm, and at present, domestic steel mills are still unable to smelt the raw materials of this specification and weight, failing to meet the demand. The subsection welding method involves considerable consumption of raw materials and complex operation and equipment, and more seriously, it fails to ensure the uniformity of structure and performance. Since a solid solubility of Cr in Cu is up to 0.73 wt %, the QCr0.8 copper alloy is prone to segregation, which will significantly impact the mechanical property, especially the yield strength, of the alloy. Currently, the forged product generally has a yield strength of lower than 90 MPa, which will seriously affect the use reliability.

SUMMARY

In order to overcome the problems of the prior art, the present disclosure provides a method for forming a QCr0.8 alloy tapered cylindrical ring with uniform internal structure and performance, desired yield strength and high use reliability at less consumption of raw materials.

Technical solutions of the present disclosure are described as follows.

This application provides a method for forming a QCr0.8 alloy tapered cylindrical ring, comprising:

(S1) heating a raw material followed by upsetting and stretching at least twice to obtain a primary blank;

wherein the raw material is a standard cylindrical part made of QCr0.8 alloy;

(S2) heating the primary blank followed by upsetting and chamfering to obtain a secondary blank with a top end and a bottom end; wherein a diameter of the top end of the secondary blank is greater than a diameter of the bottom end of the secondary blank;

(S3) subjecting the secondary blank to backward extrusion to process the top end and the bottom end of the secondary blank to obtain a preform;

(S4) machining the preform to remove a flash and a bottom residue of the preform;

(S5) subjecting a bottom end of the preform to local bulging to enable a shape and a size of the bottom end of the preform to match a shape and a size of a drive roller in a forming tooling, so as to form a profiled ring blank; and (S6) rolling the profiled ring blank by using a radial-axial ring rolling machine in combination with the forming tooling to form a tapered cylindrical ring.

Compared to the prior art, this application has the following beneficial effects.

(1) In the method provided herein, the raw material herein is a standard cylindrical part made of QCr0.8 copper alloy. By means of the repeated upsetting-stretching severe plastic deformation, the structural uniformity of the raw material is improved, and the segregation of Cr is mitigated, such that the yield strength of the forged product satisfies requirements of Q/M.J05121-2012.

(2) Through the backward extrusion forming, such that the equipment tonnage is reduced by half; the consumption of the raw material is reduced by at least 400 kg; and the utilization rate is improved by 3-4 times.

(3) The profiled ring blank is formed by local bulging using the forming tooling, which can effectively reduce scratches caused by an upward axial motion of a bottom end of the material when subjected to a compressive stress during the forming process, ensuring the surface quality of the tapered cylindrical ring.

(4) The radial and axial ring rolling technology is used to roll the profiled ring blank, and the continuous local plastic deformation is realized by a sectional tooling, such that the rolling requirements of the tapered cylindrical ring with a bottom diameter of Φ400-650 mm, a cone angle of 60-120° and a height of 380-540 mm can be satisfied.

Figure 1:
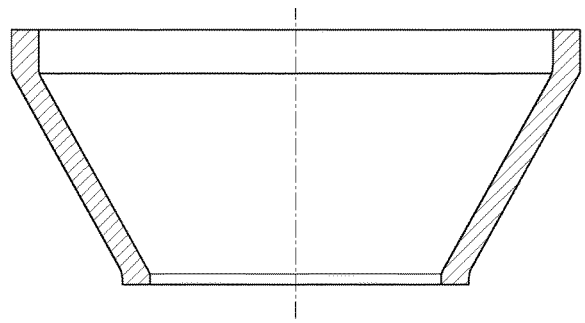
FIG. 1 schematically shows a tapered cylindrical ring according to Embodiment 1 of the present disclosure.

In the drawings, 1, drive roller; 11, drive shaft; 12, drive shaft sleeve; 2, core roller; 21, first drive shaft sleeve part; 211, first radial protrusion; 22, second drive shaft sleeve part; 23, third drive shaft sleeve part; 24, fourth drive shaft sleeve part; 241, second radial protrusion; 3, mandrel; and 4, mandrel sleeve.

DETAILED DESCRIPTION OF EMBODIMENTS

The disclosure will be clearly and completely described below to make features and advantages of the disclosure clear and definite.

Figure 2:
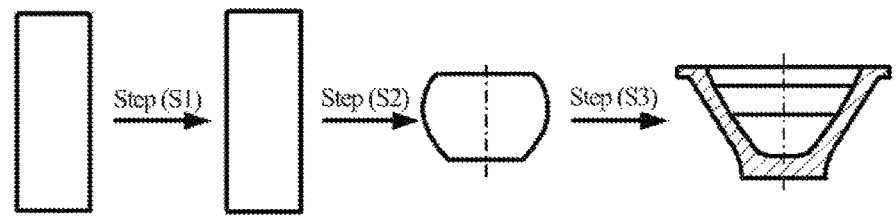
FIG. 2 is a flow chart of a method for forming the tapered cylindrical ring.
Figure 2:
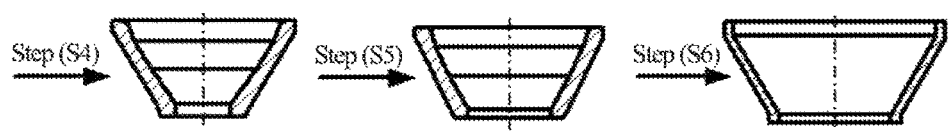

As shown in FIG. 2, a method for forming a QCr0.8 alloy tapered cylindrical ring is provided, which includes the following steps.

(S1) A raw material is heated and subjected to upsetting and stretching at least twice to obtain a primary blank, where the raw material is a standard cylindrical part of QCr0.8 alloy. A size of the raw material is restored to an original size to improve the structure uniformity.

(S2) The primary blank is heated and subjected to upsetting and chamfering to obtain a secondary blank with a top end and a bottom end, where a diameter of the top end of the secondary blank is greater than a diameter of the bottom end of the secondary blank.

(S3) The secondary blank is subjected to backward extrusion to process the top end and the bottom end of the secondary blank to obtain a preform.

(S4) The preform is machined to remove a flash and a bottom residue of the preform.

(S5) A bottom end of the preform is subjected to local bulging to enable a shape and a size of the bottom end of the preform to match a shape and a size of a drive roller in a forming tooling, so as to form a profiled ring blank.

(S6) the profiled ring blank is rolled by using a radial-axial ring rolling machine in combination with the forming tooling to form a tapered cylindrical ring.

Specifically, the QCr0.8 copper alloy is chromium bronze which has great strength and hardness at room temperature and below 400° C., has excellent electrical conductivity and thermal conductivity, as well as has great abrasive resistance and anti-friction property. After subjected to aging treatment, the hardness, strength, electrical conductivity and thermal conductivity of the QCr0.8 ally are significantly improved, so as to facilitate the welding and brazing and improve the oxidation resistance at high temperature.

In the step (S1), the raw material is heated to 750-850° C. at a heating coefficient of 0.4-0.6 min/mm. A final forging temperature is not less than 650° C. After the forging, the raw material is subjected to air cooling. A strain of the upsetting and stretching of the raw material is controlled to 0.30-0.65. A lower strain will fail to significantly enhance the performance of the raw material, and a higher strain will easily cause defects, such as cracks.

In the step (S2), the primary blank is heated to 750-850° C. A heating coefficient is 0.4-0.6 min/mm. The upsetting of the primary blank is performed on a press machine. A bottom end of the primary blank is subjected to the chamfering to have a chamfer angle of 35-70°, and then to one-heat forming to form the bottom end of the secondary blank. A final forging temperature is not less than 650° C. An air cooling is performed following the one-heat forming. In an embodiment, the secondary blank is subjected to polishing to remove defects of a surface thereof, and a breadth-depth ratio of the polishing is not less than 8:1.

The step (S3) is specifically performed through the following steps. The secondary blank is heated to 750-850° C. at a heating coefficient of 0.4-0.6 min/mm. The secondary blank is subjected to one-time extrusion molding on a press machine. A final forging temperature is not less than 650° C. An air cooling is performed after forging to form the preform with a cone angle of 40-90° and a bottom diameter of Φ330-480 mm.

In the step (S4), the flash and bottom residue of the preform are removed using a lathe to form an opening of a top end of the preform and an opening of a bottom end of the preform. The preform has a bottom filleted corner of R10-R20, and has a top filleted corner of R10-R20 or a top blunted acute angle.

In the step (S5), the local bulging of the bottom end of the preform obtained in step (S4) is performed stepwise on an electro-hydraulic hammer or a press machine with punches with different diameters to form the profiled ring blank, where diameters of the punches are separately selected from Φ350-600 mm.

In the step (S6), the forming tooling includes a drive roller 1 and a core roller 2. The drive roller 1 includes a drive shaft 11 and a drive shaft sleeve 12. The drive shaft 11 is in splined connection with the drive shaft sleeve 12. The drive shaft sleeve 12 is sleeved on the drive shaft 11. An outer surface of the drive shaft sleeve 12 is matched with an outer surface of the tapered cylindrical ring. The core roller 2 includes a mandrel 3 and a mandrel sleeve 4. The mandrel 3 is in splined connection with the mandrel sleeve 4. The mandrel sleeve 4 is sleeved on the mandrel 3. An outer surface of the mandrel sleeve 4 is matched with the outer surface of the tapered cylindrical ring. The drive roller 1 is configured to cooperate with the core roller 2 to squeeze and roll the profiled ring blank to give the tapered cylindrical ring.

In an embodiment, the drive shaft sleeve 12 includes multiple drive shaft sleeve parts. The drive shaft sleeve parts are stacked to form the drive shaft sleeve 12. The drive shaft sleeve parts are connected fixedly by a detachable pin.

Specifically, the multiple drive shaft sleeve parts include a first drive shaft sleeve part 21, a second drive shaft sleeve part 22, a third drive shaft sleeve part 23 and a fourth drive shaft sleeve part 24. The first drive shaft sleeve part 21, the second drive shaft sleeve part 22, the third drive shaft sleeve part 23 and the fourth drive shaft sleeve part 24 are stacked to form the drive shaft sleeve 12. The first drive shaft sleeve part 21, the second drive shaft sleeve part 22, the third drive shaft sleeve part 23 and the fourth drive shaft sleeve part 24 are connected fixedly by the detachable pin. The drive shaft sleeve 12 is arranged separately to facilitate a combination of the different drive shaft sleeve parts to obtain different specifications of the drive roller 1, such that different specifications of products are obtained.

In an embodiment, a side surface of an uppermost drive shaft sleeve part of the plurality of drive shaft sleeve parts is provided with a first radial protrusion, and a side surface of a lowermost drive shaft sleeve part of the plurality of drive shaft sleeve parts is provided with a second radial protrusion. The first radial protrusion and the second radial protrusion are configured to limit and maintain a shape of the profiled ring blank during the rolling.

Specifically, the side surface of the first drive shaft sleeve part 21 of the drive shaft sleeve 12 is provided with a first radial protrusion 211. The side surface of the fourth drive shaft sleeve part 24 is provided with a second radial protrusion 241. The first radial protrusion 211 and the second radial protrusion 241 are configured to limit and maintain the shape of the profiled ring blank during the rolling to obtain the tapered cylindrical ring.

The forming tooling can roll a tapered cylindrical ring with a bottom diameter of Φ400-650 mm, a cone angle of 40-90°, and a height of 380-540 mm.

The method provided herein further includes the following step.

The tapered cylindrical ring is heated at 600-650° C., and then kept at 600-650° C. for 2.5 h and naturally cooled.

Embodiment 1

(1) A raw material with a size of Φ350×1000 mm is subjected to repeated upsetting and stretching under heating to improve the structural uniformity, where the heating is performed at 800° C. and a heating coefficient of 0.4-0.6 min/mm, and a final forging temperature is not less than 650° C. In the first upsetting and stretching, the raw material is treated by upsetting to a size of Φ450×600 mm, and then stretched to a size of 320×320×940 mm; and in the second upsetting and stretching, the primary blank with a size of 320×320×940 mm is treated by upsetting to a size of Φ450×600 mm and stretched to a size of 320×320×940 mm, and then shaped to a size of Φ 350×1000 mm.

(2) The primary blank is heated to 800° C. at a coefficient of 0.4-0.6 min/mm. The Φ350×1000 mm primary blank is treated by upsetting to a height of 440±10 mm and chamfered by an angle of 55° to give a secondary blank. A final forging temperature is not less than 650° C. The secondary blank is subjected to air cooling after the forging, and polished to remove surface defects and to reach a width-depth ratio of not less than 8:1.

(3) The secondary blank is subjected to backward extrusion using an extrusion mold to form a preform, where the backward extrusion is performed at a heating temperature of 800° C. and a coefficient of 0.4-0.6 min/mm. Cone angles at different height of the preform are 40°, 60° and 70°, respectively. The preform has a bottom diameter of Φ400 mm and a height of 565 mm. A final forging temperature is not less than 650° C.

(4) The preform is machined on a lathe to remove a flash and a bottom residue of the preform to form a profiled ring blank, where a diameter of a top end of the profiled ring blank is Φ890 mm; a bottom end of the profiled ring blank is Φ425 mm; and a height of the profiled ring blank is 485 mm.

(5) The bottom end of the profiled ring blank is subjected to local bulging by punches respectively with a diameter of Φ360 mm and Φ390 mm, where after the local bulging, the diameter of the bottom end of the profiled ring blank reaches Φ527 mm, and the height of the profiled ring blank is 455 mm.

Figure 3:
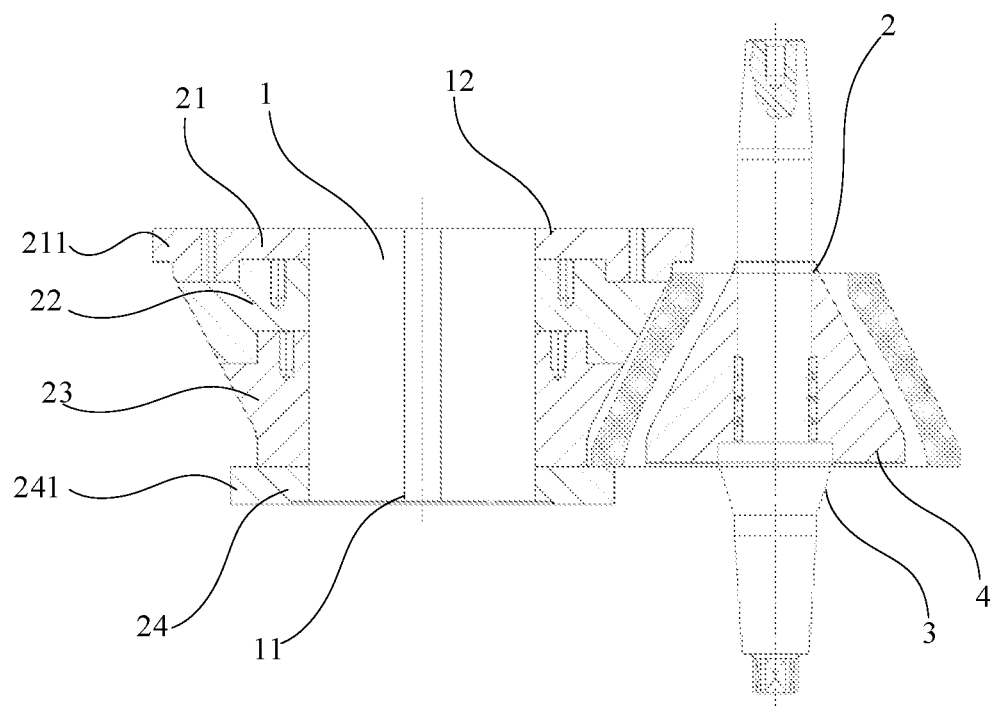
FIG. 3 schematically depicts a structure of a tooling according to an embodiment of the present disclosure.

(6) The profiled ring blank is further subjected to continuous local plastic deformation using a D53K-2000A radial-axial numerical control ring rolling machine in combination with a section tooling shown in FIG. 3, so as to form the tapered cylindrical ring shown in FIG. 1, where parameters of the numerical control ring rolling machine are shown in Table 1.

TABLE 1

Parameters of a numerical control ring rolling machine

| Number | Parameters | Value |
|---|---|---|
| 1 | Radius of upper part and lower part of drive roller: R1a, R1b/mm | 606, 400 |
| 2 | Radius of upper part and lower part of core roller: R2a, R2b/mm | 100, 314.25 |
| 3 | Initial temperature of profiled ring blank/° C. | 800 |
| 4 | Ambient temperature/° C. | 30 |
| 5 | Rotation speed of drive roller/r/min | 30 |

(7) The tapered cylindrical ring shown in FIG. 1 is heated and measured for the size, where the results show that the size of the tapered cylindrical ring satisfies related requirements. The tapered cylindrical ring is sampled at a sampling area shown in FIG. 1 to test the structure performance. The structure performance satisfies a requirement of technical condition Q/M.J05121-2012, and a yield strength is 105-120 MPa. Compared to the traditional forming method in which the raw material has a specification of Φ400×1100 mm and more than 1300 kg of the raw material is consumed, the method provided herein significantly reduces the consumption of raw material and lowers the cost.

Described above are only some embodiments of the present disclosure, which are not intended to limit the disclosure. It should be understood that any variations, replacements and improvements made by those of ordinary skilled in the art without departing from the spirit of the disclosure shall fall within the scope of the disclosure defined by the appended claims.

The content not described in detail in the description is well known to those of ordinary skill in the art.

What is claimed is:

1. A method for forming a QCr0.8 alloy tapered cylindrical ring, comprising:
(S1) heating a raw material to 750-850° C. followed by upsetting and stretching at least twice to obtain a primary blank;
wherein the raw material is a standard cylindrical part made of QCr0.8 alloy;
(S2) heating the primary blank to 750-850° C. followed by upsetting and chamfering to obtain a secondary blank with a top end and a bottom end; wherein a diameter of the top end of the secondary blank is greater than a diameter of the bottom end of the secondary blank;
(S3) subjecting the secondary blank to backward extrusion to process the top end and the bottom end of the secondary blank to obtain a preform;
(S4) machining the preform to remove a flash and a bottom residue of the preform;
(S5) subjecting a bottom end of the preform to local bulging to enable a shape and a size of the bottom end of the preform to match a shape and a size of a drive roller in a forming tooling, so as to form a profiled ring blank; and
(S6) rolling the profiled ring blank by using a radial-axial ring rolling machine in combination with the forming tooling to form a tapered cylindrical ring;
wherein the step (S3) is performed through steps of:
heating the secondary blank to 750-850° C. at a heating coefficient of 0.4-0.6 min/mm;
subjecting the secondary blank to one-step extrusion molding on a press machine; and
performing air cooling after forging to form the preform with a cone angle of 40-90° and a bottom diameter of Φ330-480 mm;
wherein a final forging temperature is not less than 650° C.

2. The method of claim 1, wherein in step (S1), a heating coefficient is 0.4-0.6 min/mm; a final forging temperature is not less than 650° C.; after forging, the raw material is subjected to air cooling; and a strain of the upsetting and stretching of the raw material is controlled to 0.30-0.65.

3. The method of claim 1, wherein in step (S2), a heating coefficient is 0.4-0.6 min/mm; the upsetting of the primary blank is performed on a press machine; a bottom end of the primary blank is subjected to the chamfering to have a chamfer angle of 35-70°, and then to one-heat forming to form the bottom end of the secondary blank; a final forging temperature is not less than 650° C.; and an air cooling is performed following the one-heat forming.

4. The method of claim 1, wherein in step (S4), the flash and bottom residue of the preform are removed using a lathe; and the preform has a bottom filleted corner of R10-R20, and has a top filleted corner of R10-R20 or a top blunted acute angle.

5. The method of claim 1, wherein in step (S5), the local bulging of the bottom end of the preform obtained in step (S4) is performed stepwise on an electro-hydraulic hammer or a press machine with punches with different diameters to form the profiled ring blank, wherein diameters of the punches are separately selected from D 350-600 mm.

6. The method of claim 1, wherein in step (S6), the forming tooling comprises a drive roller and a core roller; the drive roller comprises a drive shaft and a drive shaft sleeve; the drive shaft is in splined connection with the drive shaft sleeve; the drive shaft sleeve is sleeved on the drive shaft; an outer surface of the drive shaft sleeve is matched with an outer surface of the tapered cylindrical ring; the core roller comprises a mandrel and a mandrel sleeve; the mandrel is in splined connection with the mandrel sleeve; the mandrel sleeve is sleeved on the mandrel; an outer surface of the mandrel sleeve is matched with the outer surface of the tapered cylindrical ring; and the drive roller is configured to cooperate with the core roller to squeeze and roll the profiled ring blank to give the tapered cylindrical ring.

7. The method of claim 6, wherein the drive shaft sleeve comprises a plurality of drive shaft sleeve parts; the plurality of drive shaft sleeve parts are stacked to form the drive shaft sleeve; and the plurality of drive shaft sleeve parts are connected fixedly by a detachable pin.

8. The method of claim 7, wherein a side surface of an uppermost drive shaft sleeve part of the plurality of drive shaft sleeve parts is provided with a first radial protrusion, and a side surface of a lowermost drive shaft sleeve part of the plurality of drive shaft sleeve parts is provided with a second radial protrusion; the first radial protrusion and the second radial protrusion are configured to limit and maintain a shape of the profiled ring blank during the rolling.

9. The method of claim 1, further comprising:

heating the tapered cylindrical ring at 600-650° C.; and keeping the tapered cylindrical ring at 600-650° C. for 2.5 h followed by air cooling.

* * * * *